(12) United States Patent
Sime

(10) Patent No.: US 8,189,032 B2
(45) Date of Patent: May 29, 2012

(54) TACTILE SIGNAL TRANSFER ARRANGEMENT

(76) Inventor: Nicholas B. Sime, Racine, WI (US)

( * ) Notice: Subject to any disclaimer, the term of this patent is extended or adjusted under 35 U.S.C. 154(b) by 685 days.

(21) Appl. No.: 12/364,565

(22) Filed: Feb. 3, 2009

(65) Prior Publication Data
US 2009/0195711 A1   Aug. 6, 2009

Related U.S. Application Data

(60) Provisional application No. 61/025,981, filed on Feb. 4, 2008.

(51) Int. Cl.
*H04N 7/00* (2006.01)
(52) U.S. Cl. .......................................... 348/36
(58) Field of Classification Search .................. 348/836, 348/143, 36; 381/91, 362; *H04N 7/00*
See application file for complete search history.

(56) References Cited

U.S. PATENT DOCUMENTS

| | | | |
|---|---|---|---|
| 1,946,565 A | 2/1934 | Baumann | |
| 1,956,796 A | 5/1934 | Hull | |
| 2,122,778 A * | 7/1938 | Mueller | 248/125.9 |
| 2,235,518 A * | 3/1941 | Goshaw | 381/91 |
| 2,421,437 A * | 6/1947 | Ryan et al. | 381/362 |
| 2,554,295 A | 5/1951 | Cooper | |
| 2,684,462 A | 7/1954 | Tyzzer | |
| 4,275,269 A * | 6/1981 | Sugita et al. | 381/82 |
| 6,789,519 B1 * | 9/2004 | Bell | 123/179.2 |
| 6,813,361 B1 | 11/2004 | Jeffs et al. | |

* cited by examiner

*Primary Examiner* — Tung Vo
(74) *Attorney, Agent, or Firm* — Andrus, Sceales, Starke & Sawall, LLP

(57) ABSTRACT

A signal transfer arrangement is provided for conveying a signal from a first location to a second location. The signal transfer arrangement includes an articulated support structure rotatably mounted on a base located on a support surface. The support structure has a mobile collection device for receiving an input signal from at least one input emission device at the first location positioned on the support surface without contact between the collection device and the emission device, and transferring the input signal to the second location.

20 Claims, 5 Drawing Sheets

TACTILE SIGNAL TRANSFER ARRANGEMENT

CROSS REFERENCE TO RELATED APPLICATIONS

This application relates to and claims priority of U.S. Provisional Patent Application Ser. No. 61/025,981, filed Feb. 4, 2008.

FIELD OF THE INVENTION

This disclosure relates to a signal transfer, and more particularly, pertains to an arrangement capable of altering or enhancing an audio or video signal.

BACKGROUND OF THE INVENTION

Signal transfer, as it pertains to this disclosure, is a method of conveying a signal from one transmission line to another without contact. This occurs through the emission of an energetic medium such as an electromagnetic field, infrared light, or ultrasound. Utilizing one of these energetic mediums, the transfer of a signal relies on the pairing of an emission device and a collection device. In the case of infrared light, the emission device would be an infrared light emitting diode and a collection device would be an infrared phototransistor. In another type of signal transfer, the electromagnetic fields are created between wire coils. With electromagnetic fields, the coils can act as either the emission or collection device.

In producing audio and video special effects, it is often necessary to redirect the signal path to include additional effects or exclude certain effects. In the case of live instrumental performances, it is necessary to switch between audio effects quickly without disconnecting any support equipment. The signal switching devices that currently exist require either a high degree of dexterity not usually afforded in the midst of a performance or are usually capable of only handling two signal sources. It is desirable to provide an arrangement which will switch between a plurality of signal sources in fractions of a second.

SUMMARY OF THE INVENTION

The disclosure relates to a signal transfer arrangement for conveying a signal from a first location to a second location. The arrangement includes an articulated support structure rotatably mounted on a base located on a support surface. The support structure has a mobile collection device for receiving an input signal from at least one input emission device at the first location positioned on the support surface without contact between the collection device and the emission device, and transferring the input signal to the second location.

In the preferred embodiment, the base carries a rotary bearing assembly having a lower member fixed to the base, and an upper member rotatably mounted to the lower member. A mounting bracket is secured to the upper member of the rotary bearing assembly. A main support member is pivotally connected to the mounting bracket. A support arm assembly is pivotally mounted to the main support member, the support arm assembly having a front end and a rear end. A first power actuator is connected at a lower end to a pivot bracket structure pivotally joined to the mounting bracket, and is pivotally connected at an upper end to a cylinder hinge and actuator plate joined to a rear end of the support arm assembly. A second power actuator is pivotally actuated at a lower end to an extension bracket structure attached to the mounting bracket, and is pivotally connected at an upper end to the main support member. The first and second actuators are preferably pneumatic cylinders controlled by air valves.

The front end of the support arm assembly supports the mobile collection device in the form of a coil core having a stylus coil wound thereon. The coil core has a handle provided with an electrical switch connected to a power supply in communication with the air valves. A control wire runs from the stylus core through hollow portions of the support arm assembly and the main support member to an amplifier. The input emission device is at least node coil. The articulated support structure controls movement of the collection device towards and away from the input emission device to vary the volume of the signal being transferred. The input signal is received by the mobile collection device from the input emission device electromagnetically.

In another aspect of the disclosure, a signal transfer arrangement is provided for conveying a signal from a first location to a second location. The signal transfer arrangement includes an articulated support structure rotatably mounted on a base supported on a support surface. The support surface has a mobile collection device for receiving an input signal from at least one input emission device without contact between the collection device and the emission device, and transferring the input signal to an amplifier for adjusting a magnitude of the input signal. An input source provides the input signal, and an output source is connected to the amplifier.

The input source is preferably an audio source for providing an audio signal. The output source is an audio reproduction source for playing audio through speakers. The input signal may be changed by a processing device before being received by the collection device.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
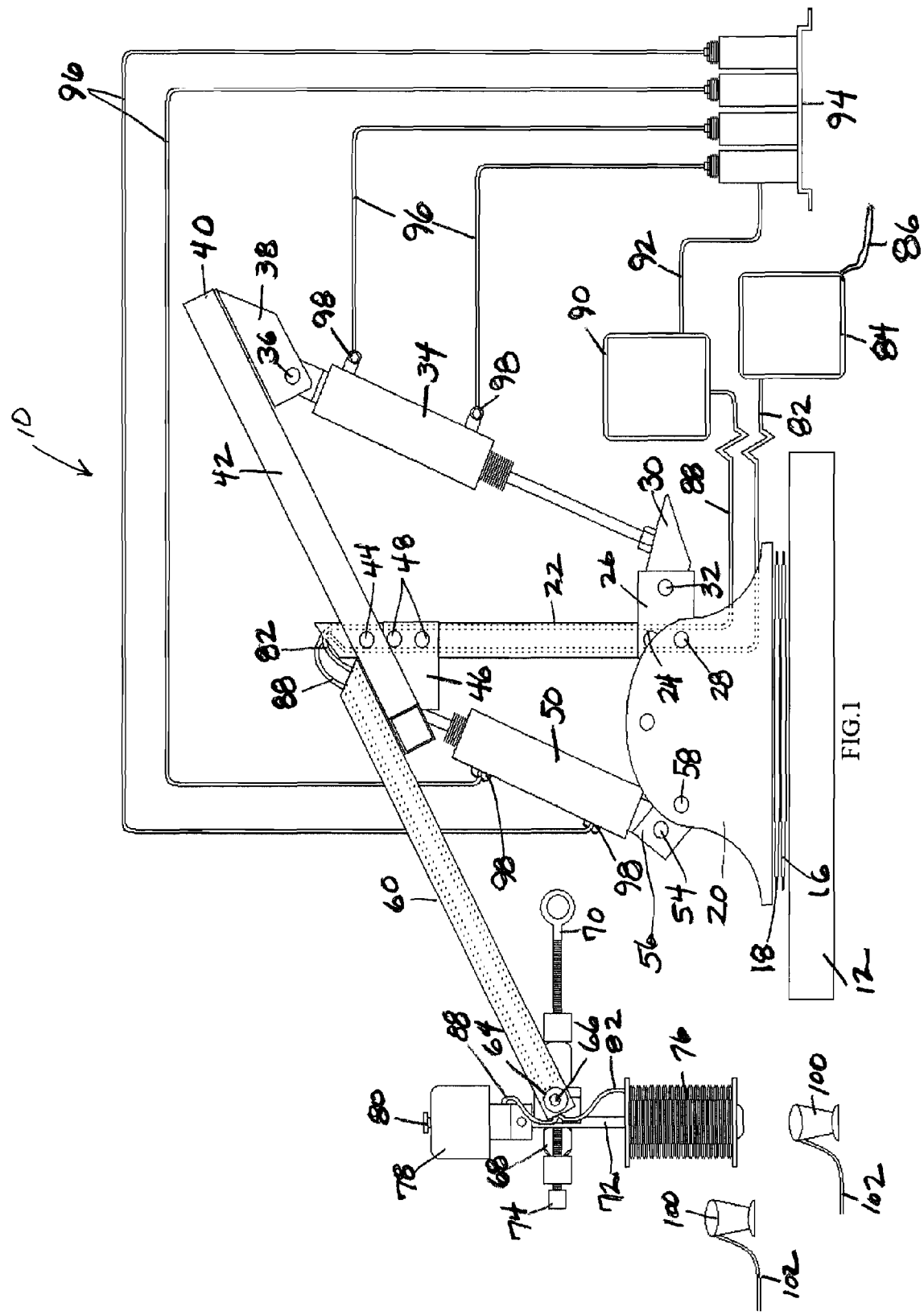
FIG. 1 is an elevational view of the tactile signal transfer arrangement.
Figure 2:
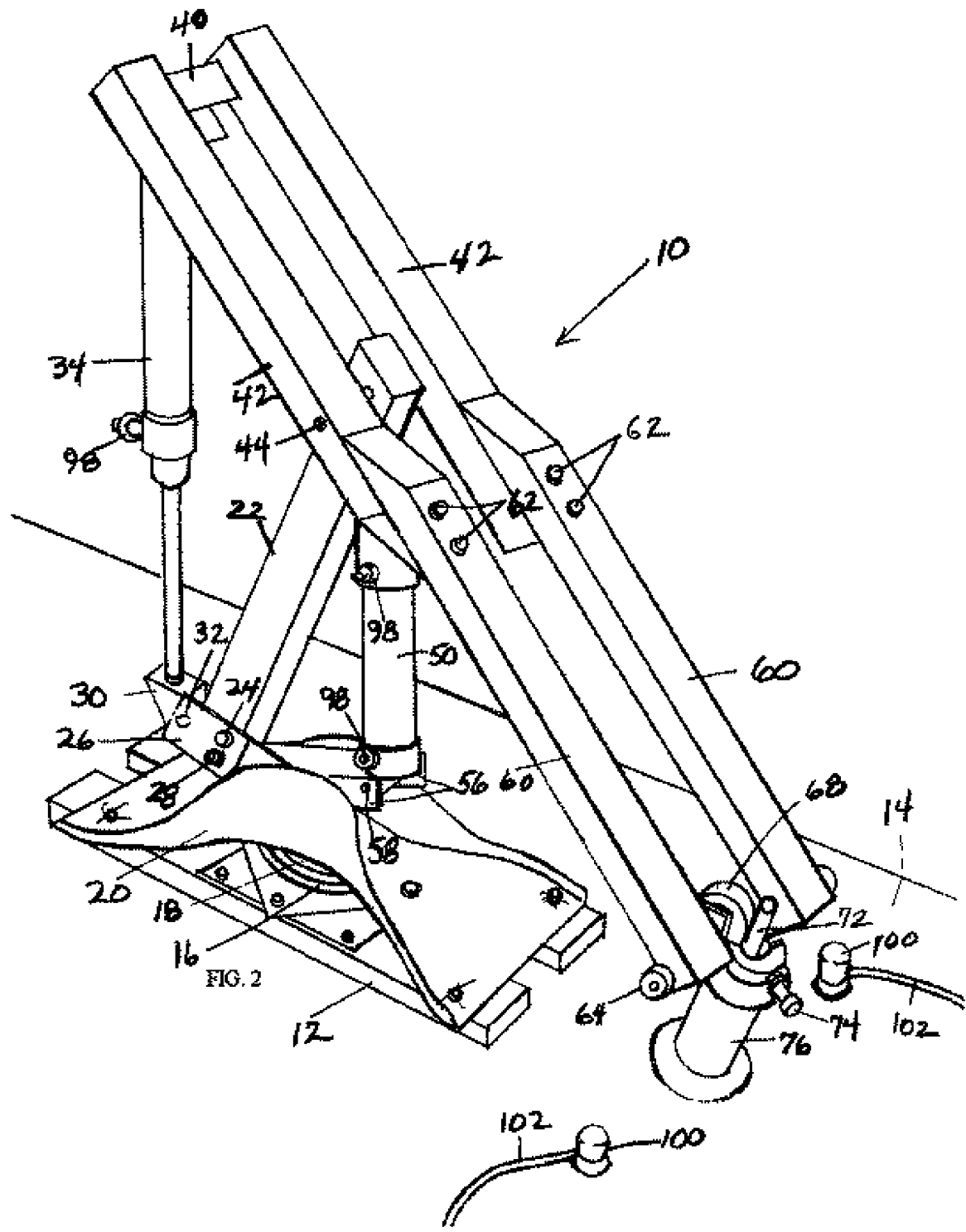
FIG. 2 is a partial rear isometric view of the tactile signal transfer arrangement.

Referring to the drawings, a tactile signal transfer arrangement 10 includes a counterweight base 12 positioned upon a planar support surface 14 (FIG. 2). The base 12 carries a rotary bearing assembly with a fixed lower member 16 and an upper member 18 rotatably mounted thereto. The rotatable upper member 18 supports a saddle-shaped mounting bracket 20. A main support member 22 has a lower end which is attached by a connector 24 between a pair of parallel pivot brackets 26 extending from the mounting bracket 20. The main support member 22 and the pivot brackets 26 are pivotally secured to mounting bracket 20 by a connector 28. A cylinder hinge 30 is pivotally attached between the pivot brackets 26 by a connector 32.

The cylinder hinge 30 is joined to a lower rod end of a rear pneumatic cylinder 34 having a top end that is pivotally mounted by a connector 36 to a cylinder hinge 38. The cylinder hinge 38 is fastened to an adaptor plate 40 that joins the outer ends of a pair of rear parallel support members 42. Inner ends of the rear support members 42 are pivotally connected by a connector 44 to a top end of the main support member 22. A pair of pivot brackets 46 is fixed by connectors 48 located beneath connector 44 to the main support member 22.

Figure 3:
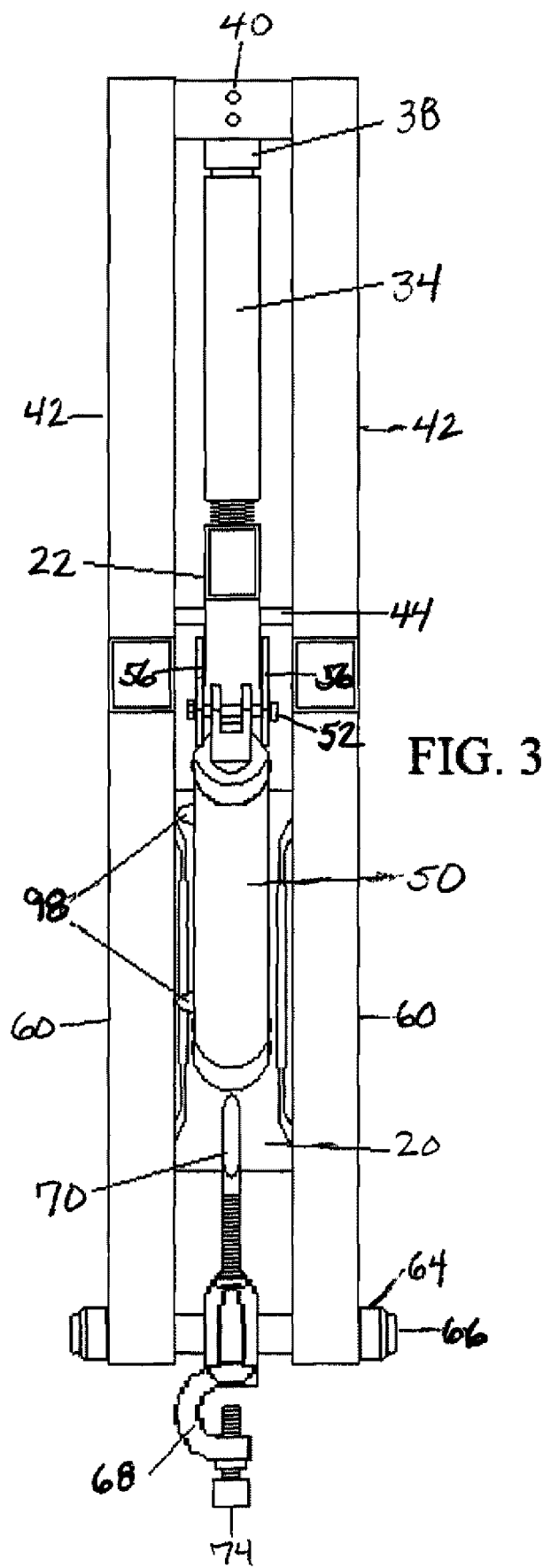
FIG. 3 is a top view of the tactile signal transfer arrangement including a coil clamp shown with the coil and handle removed.
Figure 4:
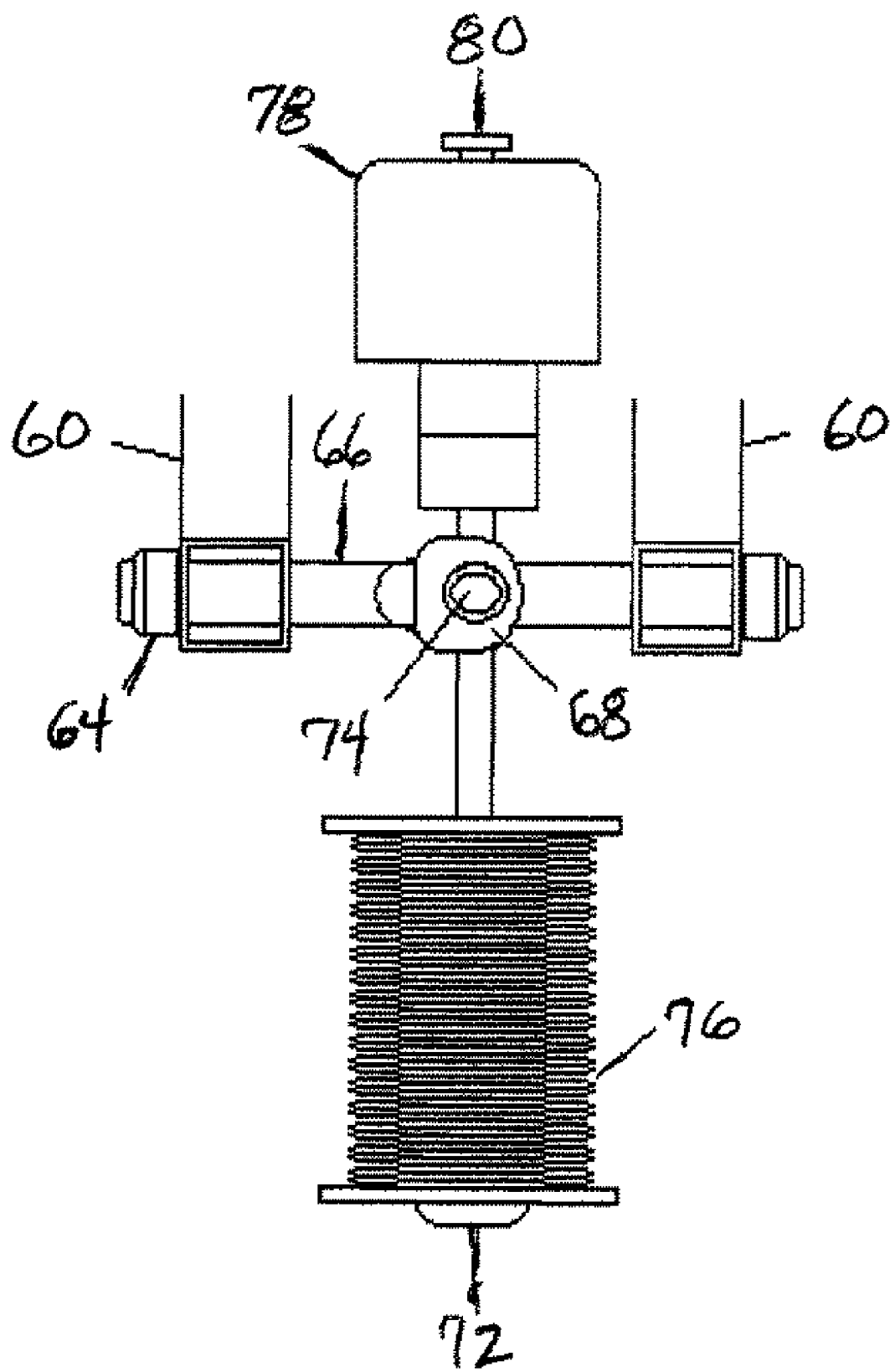
FIG. 4 is a partial front view of the signal transfer arrangement, showing additional detail of the coil clamp.

A top end of a front pneumatic cylinder 50 is pivotally connected between the pivot brackets 46 by a connector 52 (FIG. 3). A lower end of the front pneumatic cylinder 50 is pivotally joined by another connector 54 between a pivot of extension brackets 56 that extend from the mounting bracket 20 and are fixedly retained thereto by connector 58.

A pair of front parallel support members 60 is fixedly connected to the rear parallel support members 42 by connectors 62 (FIG. 2). The outer ends of the front support members 60 are braced together by a pivot shaft 64 retained in place by collars 66 positioned on the ends of the pivot shaft 64. A double C-clamp 68 has one portion clamped to the pivot shaft 64 with a counterweight bolt 70. Another portion of clamp 68 is joined to a vertically extending coil core 72 by a clamp bolt 74. A stylus coil 76 is wound on a lower end of the coil core 72, while a handle 78 equipped with an electrical switch 80 is attached to an upper end of the coil core 72. By this arrangement, the coil core 72 and the stylus coil 76 are thus pivotally supported on the other ends of support members 60 and held in a selected rotational position by adjusting clamp bolt 74.

An output wire 82 runs from the coil 76 and is routed through a hollow interior of one of the front support members 60 and the main support member 22 (as shown in dotted lines) for connection to an amplifier 84 having an output lead 86. A control wire 88 is joined to the electrical switch 80 and routed through one of the front support members 60 and the main support member 22 for connection to a power supply 90. The power supply 90 has power leads 92 extend to a bank of electrically controlled air valves 94, each of which is appropriately connected by a tubing 96 to a nipple 98 on pneumatic cylinders 34, 50. Two stationary nodes or coils 100 having input leads 102 are positioned on the planar surface 14 below the stylus coil 76.

The above described arrangement 10 thus defines an articulated rotatable support structure having support members 22, 42, 60 selectively moved by means of the operation of cylinders 34, 50. The provision of the handle 78 with the electrical switch 80 operably connected to the air valves 94 and the cylinders 34, 50 creates a tactile, hands-on selective switching arrangement.

In the preferred embodiment of the invention, the objective is to bring two coils into proximity to each other. The structure of the invention allows the mobile coil or stylus 76 to be suspended over the stationary nodes or coils 100. The structure is able to rotate 360° which allows the mobile coil 76 to pan each stationary coil 100. Electromagnetic fields are created between the coils 76, 100 via mutual inductance as is well known, and enable signal transfer from an input to a output.

The pneumatic cylinders 34, 50 afford the structure and ability to extend above the stationary coils 100 allowing volume control of the signal being selected. Also, the cylinders 34, 50 enable the position set by the operator to be maintained. This occurs when the operator presses switch 80 on the handle 78 and electrically activates the valves 94. The valves 94 open to equalize the air pressures within the pneumatic cylinders 34, 50. Then, the structure is free to move in all directions that the operator intends. When the switch 80 is released, the valves 94 close and lock the air in the cylinders 34, 50. This renders the structure immovable, thus maintaining the volume and signal selection.

Figure 5:
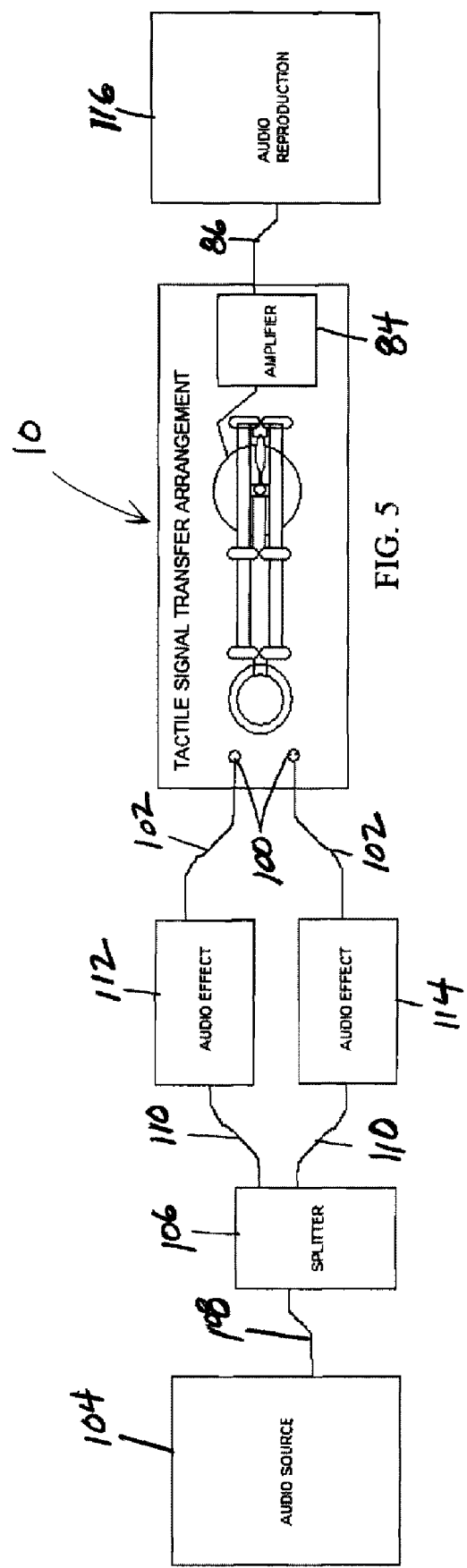
FIG. 5 is a block diagram showing an exemplary application of the tactile signal transfer arrangement.

An example of a use for this invention is illustrated in the adjoining block diagram of FIG. 5. In this arrangement, the arrangement 10 is utilized for the switching between different audio effects. An audio source 104 can be any audio device or instrument with an output such as a CD player, guitar or computer. The signal from source 104 travels to a splitter 106 by a connecting cable 108. Once the signal is at the splitter 106, copies of the signal are made. In this case, two copies are made and both continue over separate connecting cables 110 to different audio effects 112, 114 where the input signals are processed. In this example, one effect 112 produces harmonic distortion while the other effect 114 modulates the signal. The affected signals are fed through leads 102 into the node coils 100 at a first location. The signals are then transferred to the mobile coil 76 without contact with coils 100 and without a wired connection. The selected signal leaves the coil 76 through lead 86 connected to the amplifier 84 at a second location remote from the base 12. The amplifier 84 adjusts the volume of the signal to an appropriate level for input to an audio reproduction stage 116. The equipment used for audio reproduction can be a stereo or some other device to which speakers can be connected.

An alternate embodiment of this invention also provides for the tactile control and selection of a video signal. The same mechanical layout would be used for a video rendition of the invention. The method of transferring the signal would be a photoelectric process instead of using electromagnetic coils. Electronically, it would consist of photonic emission device such as an LED in place of the stationary coil. A photo receiver such as a phototransistor would replace the mobile coil. The plurality of inputs for the video arrangement could be multiple cameras that are rapidly selected with the invention and the output would then be displayed on a video monitor or recorded. Another arrangement could be a single video signal from a video source that is connected to a splitter in much the same way as with the audio arrangement. The multiple copies could then proceed through various video effects and be individually selected by the invention.

In the recording studio environment, this disclosure allows for a reduced number of cables since it conveys the signal between node coils 100 and coil 76 without contact therebetween, and without a wired connection. This disclosure does not require an unused connection to actually be connected, hence the number of cables used is reduced.

Various alternatives and embodiments are contemplated as being within the scope of the following claims particularly pointing out and distinctly claiming the subject matter regarded as the invention.

What is claimed is:

1. A signal transfer arrangement for conveying a signal from a first location to a second location, the arrangement comprising:

an articulated support structure having a support arm assembly pivotally mounted to a main support member rotatably mounted on a base located on a support surface, the support structure having a mobile collection device mounted on the support arm assembly for receiving an input signal from at least one input emission device at the first location positioned on the support surface separate from the support structure wherein, in use, the collection device is movable relative to the emission device to transfer the input signal without contact or wired connection between the collection device and the emission device, and transferring the input signal via a wired connection to the second location remote from the base.

2. The signal transfer arrangement of claim 1, wherein the base carries a rotary bearing assembly having a lower member fixed to the base, and an upper member rotatably mounted to the lower member.

3. The signal transfer arrangement of claim 2, wherein a mounting bracket is secured to the upper member of the rotary bearing assembly.

4. The signal transfer arrangement of claim 3, wherein a main support member is pivotally connected to the mounting bracket.

5. The signal transfer arrangement of claim 4, wherein the support arm assembly has a front end and a rear end.

6. The signal transfer arrangement of claim 5, wherein a first power actuator is connected at a lower end to a pivot bracket structure pivotally joined to the mounting bracket, and is pivotally connected at an upper end to a cylinder hinge and an adaptor plate joined to a rear end of the support arm assembly.

7. The signal transfer arrangement of claim 6, wherein a second power actuator is pivotally actuated at a lower end to an extension bracket structure attached to the mounting bracket, and is pivotally connected at an upper end to the main support member.

8. The signal transfer arrangement of claim 7, wherein the first and second actuators are pneumatic cylinders controlled by air valves.

9. The signal transfer arrangement of claim 8, wherein the front end of the support arm assembly pivotally supports the mobile collection device in the form of a coil core having a stylus coil wound thereon.

10. The signal transfer arrangement of claim 9, wherein the coil core has a handle provided with an electrical switch connected to a power supply in communication with the air valves.

11. The signal transfer arrangement of claim 10, wherein a control wire runs from the stylus coil through hollow portions of the support arm assembly and the main support member to an amplifier.

12. The signal transfer arrangement of claim 1, wherein the input emission device is at least one node coil.

13. The signal transfer arrangement of claim 1, wherein the articulated support structure controls movement of the mobile collection device towards and away from the input emission device to vary the volume of the signal being transferred.

14. The signal transfer arrangement of claim 1, wherein the input signal is received by the mobile collection device from the input emission device electromagnetically via mutual inductance.

15. A signal transfer arrangement for conveying a signal from a first location to a second location, the arrangement comprising:
   an articulated support structure having a support arm assembly pivotally mounted to a main support member rotatably mounted on a base supported on a support surface, the support structure having a mobile collection device mounted on the support arm assembly for receiving an input signal from at least one of multiple input emission devices positioned on the support surface separate from the support structure wherein, in use, the collection device is movable relative to the emission devices to transfer the input signal desired without contact or wired connection between the collection device and the emission devices, and transferring the input signal via a wired connection to an amplifier remote from the base for adjusting a magnitude of the input signal;
   an input source for providing the input signal; and
   an output source connected to the amplifier.

16. The signal transfer arrangement of claim 15, wherein the input source is an audio source for providing an audio signal.

17. The signal transfer arrangement of claim 15, wherein the output source is an audio reproduction source for playing audio through speakers.

18. The signal transfer arrangement of claim 15, wherein the input signal may be changed by a processing device before being received by the collection device.

19. The signal transfer arrangement of claim 15, wherein the collection device is a stylus coil.

20. The signal transfer arrangement of claim 15, wherein the emission devices are comprised of at least two node coils.

* * * * *